Oct. 6, 1931.  R. PATENGE  1,825,975
MILK BOTTLE SUPPORT
Filed Oct. 7, 1929
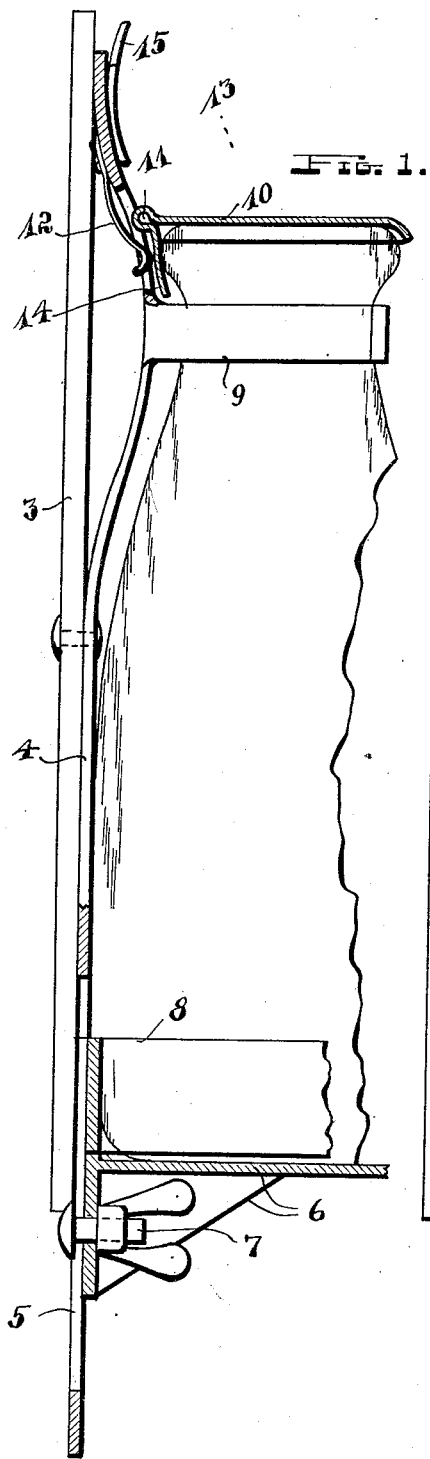
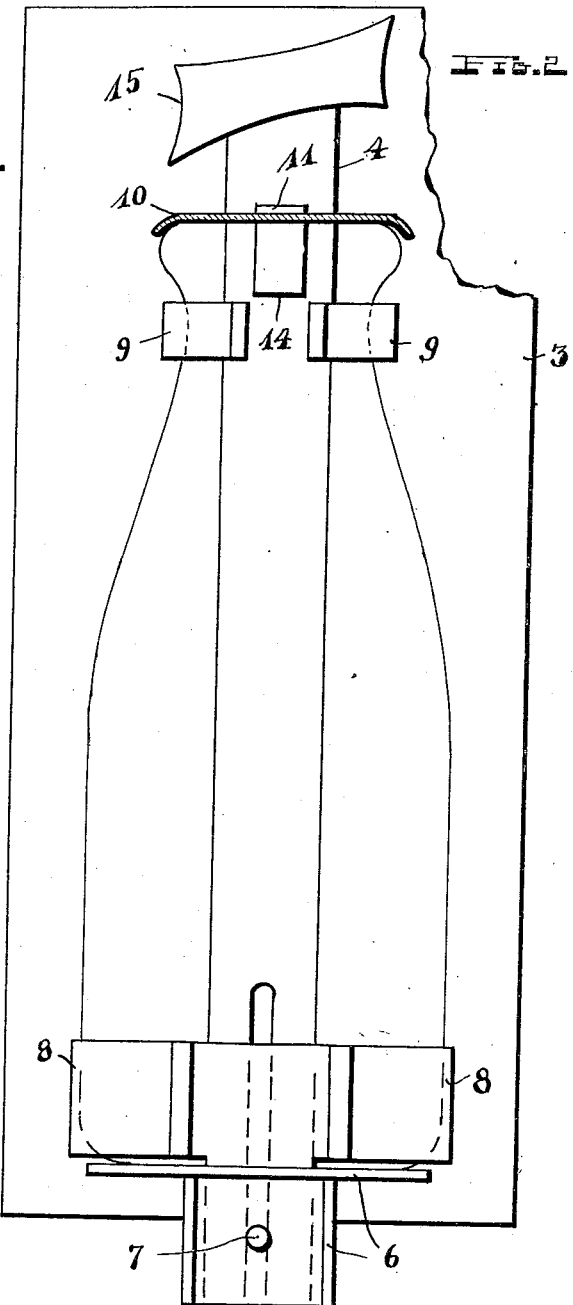
INVENTOR:
ROBERT PATENGE,
BY
his ATTORNEY.

Patented Oct. 6, 1931

1,825,975

UNITED STATES PATENT OFFICE

ROBERT PATENGE, OF LOS ANGELES, CALIFORNIA

MILK BOTTLE SUPPORT

Application filed October 7, 1929. Serial No. 397,862.

This invention relates to devices used for supporting and holding milk bottles that are delivered to individual customers.

One of the objects of this invention is to provide a support into which a milkman can securely insert a bottle to be held there in a sanitary manner protected against any touch by any animals as dogs or cats.

Another object is to provide a support that can easily be adjusted for different sizes of milk bottles.

Another object is to provide a support with a cap that will automatically cover the top of a bottle as soon as it is inserted into the support.

Other objects will appear from the following description and appended claim as well as from the accompanying drawings, in which—

Fig. 1 is a fragmentary side elevation of a simple milk bottle support partly cut away to illustrate more distinctly the constructive details of certain parts to operate according to this invention.

Fig. 2 is a fragmentary front elevation of the support illustrated in Fig. 1.

As illustrated in the drawings, the base plate or board 3 is designed so that it may be secured to a wall or any other similar suitable place around a house where milk is delivered to a customer.

A supporting member 4 of elongated shape is mounted on the base plate. The lower end of this member is in form of a slotted portion 5. A bracket 6 is held to this slotted portion by the adjusting bolt 7 for longitudinal adjustments in relation to the member 4 in order to properly place different sized milk bottles on the support.

The clamping members 8 are arranged so as to engage around the lower end of an inserted bottle, and other clamping members 9 are arranged to snap around the neck of an inserted bottle.

A cap 10 is swingably or hingedly secured at 11 to the supporting member 4, being under the tension of a spring 12 whereby the cap is normally held in a lifted position indicated in dotted lines at 13, and being furthermore provided with an extension end 14 by which the cap is automatically moved downwardly into protecting position over the top of an inserted milk bottle by the very act of an insertion of the milk bottle.

With this protecting cap in proper position, regardless of whether this supporting device is attached to a wall or fence, near the ground or higher up, no animal as a dog or cat can touch the top end of the inserted bottle which otherwise without such a device is quite likely.

It is also impossible that a bottle is broken by being knocked over by an animal as long as the bottle is securely held in this support. The attention of a housekeeper may on the other hand be attracted to the fact of a delivery of milk by a snapping sound when the bottle is inserted between the clamping members and against the movable cap closure.

The small plate 15 at the top end of the supporting member 4 is intended for the name or house-number of a customer, preventing a misplacing of a milk bottle in deliveries.

Having thus described my invention, I claim:

A milk bottle support comprising a back plate in form of a metal strip with spring members near the top end to fit around the neck of a milk bottle and a slot in the bottom-end, a bracket having a supporting plate for the bottom end of the bottle and having spring members with the lower edges spaced above the top surface of the said supporting plate for the larger portions of the spring members, and a comparatively smaller portion between the spring members resting against the said back-plate, the back portion of the bracket having an aperture, and means whereby the bracket is adjustably held to the said back-plate embodying a bolt inserted through the aperture of the bracket and the slot of the back-plate.

In testimony that I claim the foregoing as my invention I have signed my name.

ROBERT PATENGE.